United States Patent Office 3,694,304
Patented Sept. 26, 1972

3,694,304
COMPRESSED ASBESTOS SHEET PACKING PRODUCTS AND METHOD
Henry Joseph Palumbo, Middlesex, N.J., assignor to Johns-Manville Corporation, New York, N.Y.
No Drawing. Continuation of abandoned application Ser. No. 727,051, May 6, 1968. This application Apr. 5, 1971, Ser. No. 131,392
Int. Cl. B32b 19/00
U.S. Cl. 161—168                    14 Claims

ABSTRACT OF THE DISCLOSURE

Compressed asbestos sheet packings having the low density and compressibility characteristics of beater sheet packing (ASTM D-1170) but with superior tensile strength and reduced porosity can be produced by combining 3–25% hydrated calcium silicate of low bulk density with 50–75% asbestos fibers, 13–35% rubber binder, 10–50% diatomaceous earth type filler and 2–15% rubber compounding ingredients and forming sheets therefrom by a pressure rolling of the mixture.

BACKGROUND OF THE INVENTION

This application is a continuation of copending application Ser. No. 727,051, filed May 6, 1968, of the same title now abandoned.

Sheet packing or gasket materials may be divided into a variety of categories, depending upon the types of materials which are used to make the packing, upon compressibility and other physical properties or by other features which distinguish one form of this commodity from another. A standard system of identification for this class of goods has been devised by the American Society of Testing Materials and designated as D-1170. According to this system of identification, there are three basic types of gasket or packing materials, namely, Type 1 made of asbestos or other inorganic fibers, Type 2 made of cork, and Type 3 made of cellulose or other organic fibers. This present invention relates to the Type 1 product, i.e., packing materials based upon asbestos or other inorganic fibers.

The ASTM system of identification as well as industry in general further subdivides the asbestos fiber base packing or gasket materials (Type 1) into three subdivisions, namely, (1) compressed asbestos sheet, (2) asbestos beater sheet, and (3) asbestos paper and millboard. Heretofore, the compressed asbestos sheets have been of higher density and posses lower compressibility (5 to 15%) than asbestos beater sheet material which is characterized by a compressibility of about 15 to 50%. The asbestos beater sheet materials have also been distinguishable from compressed asbestos sheets by having a greater degree of porosity.

The asbestos beater sheet products are made by a wet method comparable to the formation of paper, i.e., the deposition of fibers and binder from an aqueous slurry onto a wire or other forming device. Compressed asbestos sheet products, on the other hand, are made from a dough or other plastic mass containing a combination of binder material and fibers, which is calendered or rolled into sheets. These can, if desired, be formed into denser products by press curing. The present invention relates to asbestos sheet packing products which are designated according to the ASTM system of identification as "compressed asbestos sheets," but which also exhibit several of the desirable characteristics of "asbestos beater sheets." Thus, the conventional method of making a low density sheet packing from asbestos fibers in the past has been by the wet method producing the so-called beater sheets. Sheet packing made by the sheeter process (compressed sheet products) has heretofore been a more dense product having lower compression properties, i.e., 5 to 15% when tested under a 5,000 p.s.i. load according to ASTM procedures D-1170. Weight per square yard of the prior known sheeter products has typically been from 2.3 to 2.6 pounds for product of 1/32 inch thickness.

The utility of packing and gasket materials and the applications to which such products could be placed by automotive, aeronautical, construction and other industries would be materially expanded if asbestos sheet packing having the very low porosity and other desirable properties obtainable heretofore only in compressed sheet packing could also be made to incorporate a number of the desirable qualities of beater sheet products, including low density and improved compression. It would also be advantageous to the users of the packing and gasket sheets to have these products improved in tensile strength and recovery characteristics, i.e., the ability; to return to the original dimension after compression of the sheet under substantial pressure, such as 5,000 p.s.i.

OBJECTS

A principal object of this invention is the provision of new compressed asbestos sheet packing products and methods for their preparation. Further objects include the provision of:

(1) A low density compressed asbestos sheet packing with a compression value at 5,000 p.s.i. load ranging from about 10% to about 35%.

(2) A method for the production of compressed asbestos sheet packing having compressibility comparable to asbestos beater sheet packing and gasket material, but characterized by lower porosity and higher tensile strength than is capable of attainment in asbestos beater sheets.

(3) Information on a discovery as to a process for formulating asbestos and binder compositions for use in sheeter methods of forming sheet packing material combining low density and good compression characteristics with low porosity, high tensile and high recovery values.

(4) Compositions for the formation of asbestos sheet packing and gasket products capable of use in the sheeter method of producing such products while attaining characteristics in the produced sheets that have been available heretofore only in related materials made by the so-called beater method.

Other objects and further scope of applicability of the present invention become apparent from the above and following detailed disclosure. It should be understood, however, that the following detailed description, while indicating preferred embodiments of the invention, is given by way of illustration only, since various changes and modification within the spirit and scope of the invention will become apparent to those skilled in the art from this detailed description.

SUMMARY OF THE INVENTION

The above objects are accomplished according to the present invention by the employment of each of (a) a low bulk density (preferably calcium) silicate (b) a diatomaceous earth-type filler as an essential component in admixture with (c) asbestos fibers and (d) elastomeric binder, for the formation of compressed asbestos sheet packing. Advantageously, the "hydrated" calcium silicate is employed in an amount ranging between about 5% to about 25%, preferably about 5% to about 15% by weight of the total mass (i.e., the finished sheet) which constitutes the compressed asbestos sheet packing, and the hydrated calcium silicate has a bulk density between about 5 to about 7, preferably about 5 to about 6 pounds per cubic foot and a calcium silicate water absorbency of at least about 500%. The low-bulk-density silicate must have a weight ratio to the diatomaceous-earth-type filler of about 1:4 to about 2:1, preferably about 3:8 to about 1:1.

The new forms of compressed asbestos sheet packing made by the sheeting process in accordance with the invention are characterized by the following properties:

Compressibility (at about 5,000 p.s.i. load)—at least about 5%, preferably at least 10%
An average tensile strength (approximate minimum)— about 3,000, preferably at least 3,500 p.s.i.
A transverse tensile strength—at least about 1,500, preferably at least 2,000 p.s.i.

The new compressed asbestos sheet packings in their preferred form have a density between about 1.2 to about 2.5, preferably about 1.7 to about 1.8 pounds per square yard for sheets with a thickness of about 1/32 inch, for example; a compressibility of between about 10% to about 35%, preferably about 20% to 30%, when tested under 5,000 p.s.i. load according to standard procedures (ASTM designation D-1170) and a recovery of at least about 35%, preferably at least about 40% or more.

In general terms, the new compressed asbestos sheet packings will be formed of the following components in about the indicated weight percentages:

Diatomaceous-earth-type filler—about 10% to about 50%, preferably about 15% to about 35%
Asbestos fibers—about 40% to about 75%, preferably about 45% to about 55%
Rubber binder—about 13% to about 35%, preferably about 20% to 25%
Low-bulk-density silicate—about 3% to about 25%, preferably about 5% to about 15%
Rubber compounding ingredients—about 2% to about 15%, preferably about 2% to about 10%

In their preferred form, the new compressed asbestos sheet packings of the invention employ (a) synthetic rubber (as the rubber binder component) such as butadiene-styrene (a preferred embodiment, designated SBR), or butadiene acrylonitrile (a preferred embodiment, designated NBR), or neoprene, for example, or various combinations thereof, and (b) the compounding ingredients comprise a mixture of zinc oxide, sulfur vulcanization accelerator, preferably any conventional antioxidant, and preferably also carbon black.

The rubber compounding ingredients must include a filler having a density approximating the density of diatomaceous earth, which cooperates with the hydrated calcium silicate in imparting to the sheet packing products favorable characteristics of this invention, including compressibility and recovery values, for example. The term "diatomaceous-earth-type filler" includes any filler having a low bulk density approximating that of the diatomaceous earth normally in the range of about 6.5 to about 7.5 pounds per cubic foot, such as expanded perlite, and magnesium silicate, for example. Preferred material for this purpose is diatomaceous earth which is advantageously used in an amount equal to about 10 to about 50%, preferably about 15% to about 25%, by weight of the preferred hydrated calcium silicate content of the sheet packing.

Compressed asbestos sheet packings of the new type having low density plus low porosity, high tensile strength and high recovery are preferably made by a method which comprises:

(a) Solvating the synthetic rubber portion of the packing mixture as discussed above,
(b) Mixing with the solvated rubber the asbestos fibers, the diatomaceous-earth-type filler, the silicate such as the preferred hydrated calcium silicate, and miscellaneous rubber compounding ingredients to form a dough,
(c) Forming a sheet from the dough upon a conventional revolving heated preferably metal-roll-sheeter, by feeding the dough through a nip (space) between the rolls thereof, and
(d) Removing the built-up (laminar) sheet from the collection roll by any conventional method of cutting off the sheet. In the preferred form, the method also involves press curing of the sheet after removal from the roll to form a more compact and/or better-cured final sheet.

In regard to the solvating step, the elastomer is prepared by any convenient or conventional method, such as by creating greater surface area such as by rolling (creping) for finely dividing (such as by grinding or crumbling), prior to soaking.

Example I

Ingredients: Percentage by wt.
NBR _____ 17.74
SBR (GRS 1012) rubber (crumb) _____ 4.47
Zinc oxide (powdered) _____ 1.20
Sulfur (powdered) _____ 0.54
Tetramethyl thiuram disulfide _____ 0.49
Mercaptobenzothiazole _____ 0.20
Phenyl-beta-naphthylamine _____ 0.20
Carbon black (powdered) _____ 2.95
Asbestos fiber (4T size) _____ 48.61
Hydrated calcium silicate ("Micro-Cel E") __ 7.21
Diatomaceous earth _____ 16.39

A processing dough is formed by first charging the rubber into a powdered internal blade mixer and 58 parts of gasoline are added. After this mixture is stirred for 10 minutes, all the ingredients other than the asbestos fibers and calcium silicate are charged into the mixer and stirring is continued for 15 minutes. Next the asbestos fibers are blended into the mixture over a period of 20 minutes. Finally, the calcium silicate which has been wet with gasoline is added in small 3–5 part portions and blended into the mixture over a period of 10 minutes. The mass then is further mixed for one hour producing a dough.

The dough is fabricated into a sheet of 1/32 inch thickness on a standard sheeter machine with the former drum of 126" circumference internally steam heated to a temperature of 130° C. normally using a roll rotation about 8 to 13 r.p.m. The opposed pressure roller is preferably water cooled to hold its temperature about 20–30° C. and the build-up time for the sheet is about 6 minutes.

As the excess solvent was volatilized from the surface of the dough adjacent to the hot surface of the roll, the mass adheres to the roll surface forming a continuous sheet. The opposing sheeter rolls are separated slowly to increase the opening (nip) between them allowing a continuous sheet to form. This operation is continued until a sheet of the predetermined thickness is formed.

The sheet is sliced from the forming hot roll, divided into two sections, and cooled. One section is left unpressed while the other is press cured for 15 minutes under a pressure of 500 p.s.i. at 165° C.

The resulting sheets are tested for desired properties using the procedures of ASTM D-1170 giving the following data:

|  | Unpressed, percent | Pressed, percent |
|---|---|---|
| Compression (5,000 p.s.i.) | 28 | 24 |
| Weight per square yard | 1.78 | 1.75 |

The compressed asbestos packing sheets may be described as having the low density and softness normally found in beater sheets, but they possess much lower porosity than beater sheets.

This example concerns the test procedure used to evaluate the leakage and porosity characteristics of asbestos packing and gasket sheets.

The test is performed with a gasket cut from the sheets to be evaluated of 2½" x 3⅝" size. Two such gaskets are bolted between a pair of 2"-300 lbs. raised face type flanges with a bolt torque of 20 ft.-lbs. giving a gasket stress of 1,500 p.s.i. An additional two gaskets are bolted between another pair of flanges at 40 ft.-lbs. of torque giving a gasket stress of 3,000 p.s.i. Water is then introduced to the system at a pressure of 50 p.s.i. This pressure is held for 4 hours and any leakage through the gasket is collected and measured. The exposed edges of the gaskets are also visually examined for weeping. This operation is then repeated at water pressures of 100, 200, 300, 400 and 500 p.s.i. The results are reported in volume of water leakage or the existence of visual weeping in the absence of measurable leakage.

The packing sheets of Example I when tested by this procedure all give no leakage nor visual edge weeping at 500 p.s.i. In contrast, commercially available beater sheet packings invariably produce measurable water leakage at 500 p.s.i. and even below.

At the end of the test, torque readings on the flange bolts are made to note change from the originally applied torque. Then the test assembly is dismantled and any sticking of the gasket or the flange is noted. The products of Example I exhibited less than 10% change in torque values following the test. This contrasts to commercial beater sheet gaskets which lose 25 to 75% of the initial torque. Also, the gaskets from Examples I and II separated cleanly from the flanges.

DISCUSSION OF DETAILS

Conventional asbestos sheet gasket and packing materials as classified in ASTM designation D–1170 are made by the so-called sheeter process. Such conventional compressed sheets are referred to as a dense product with a compression of about 5% to about 15% when tested under 5,000 p.s.i. load and in about the $\frac{1}{32}$ inch thickness will have a weight of about 2.3 to about 2.5 pounds per square yard. The conventional method of making low density sheet packing, i.e., material ranging from about 1.2 to about 2.5 pounds per square yard in about the $\frac{1}{32}$ inch size, is by a wet operation using the so-called beater process requiring paper making techniques and equipment. Findings and discoveries reported herein make it possible to produce a low density asbestos packing sheet having compression values comparable to beater sheets but with relatively lower gasket stress and much less porosity than is attainable with beater type sheet packing. These results have been attained by the discovery that a combination of a preferred hydrated calcium silicate, a diatomaceous-type-earth filler, a rubber binder, and asbestos fiber imparts these unique qualities to compressed asbestos sheet packing.

The preferred hydrated calcium silicate for use in accordance with the invention advantageously has a density normally between about 5 to 6 pounds per cubic foot and possesses a Gardner-Coleman water absorbency of normally at least 500%. Advantageously the material is ground or powdered to a size less than about 100 mesh of a standard sieve preferably at least about 300 mesh, and material as fine as about 600 mesh or finer may be employed. The product commercially available under the name "Micro-Cel E" (trademark) can advantageously be used in the new methods and products of this invention, as the hydrated calcium silicate component.

Another essential ingredient of the sheet-forming compositions is an elastomeric binder. This may be natural rubber or synthetic rubber. Preferred elastomers for use in the invention are the rubbery copolymers of acrylonitrile butadiene and styrene, i.e., SBR and NBR, either alone or in combination. Alternatively, one may use other synthetic elastomers such as ethylene-propylene polymer elastomers, terpolymers of ethylene, propylene and nonconjugated diene and other types of synthetic rubbers known to the art to be useful in the formation of compressed asbestos packing sheets.

Another essential component of the packing sheets is asbestos fibers. In the ordinary case, one may use normal asbestos fiber such as chrysotile asbestos fiber. As used in the specification and claims, however, the term asbestos is intended to include, in addition to chrysotile fibers, other commercial varieties such as anthophyllite, actinolite, trimolite, crocidolite, amosite, various amphibole fibers and Canadian picrolite.

The compositions used in forming the new compressed asbestos packing sheets may also contain additional ingredients which may be combined under a general heading as rubber compounding ingredients. The components are essentially conventional in the art of making compressed asbestos sheets and will include miscellaneous fillers, vulcanizing agents, vulcanizing accelerators, antioxidants, stabilizers and the like. Advantageously, the total quantity of these rubber compounding ingredients will together amount up to about 15% of the sheet-forming compositions, exclusive of any volatile solvents.

Any one of a variety of the miscellaneous fillers may be used to complete the composition and these may include graphite, carbon black, silica sand, mica, talc, clay, baryte, that is, barium sulfate, small amounts of other fibers, and similar filler compositions. The range of this type of filler may vary between about 1 and about 12% and the amount should be dictated to some extent by the amount of asbestos fibers which is employed.

The more effective sulfur accelerators are the thiuram mono-, di- or tetra-sulfides and the metal salts of dithiocarbamic acid. A thiazole is desirable as a secondary accelerator to develop satisfactory cure rates. Various other materials may be used as the curing agents including mercaptobenzothiazole and the peroxides such as dicumyl peroxide, ditertiary butyl peroxide and 2,4-dichlorobenzoyl peroxide. The amount of catalysts or accelerators will normally advantageously be between about 0.5 and about 3% of the sheet-forming compound.

Fillers which constitute a portion of the rubber compounding ingredients of the sheet-forming compositions may be selected so as to augment the effect of the hydrated calcium silicate in the formation of packing sheets having most desirable values for compressibility recovery and tensile strength in the final sheet packings. Porous fillers having a particle size of about 100 mesh or less and exhibiting a Gardner-Coleman water absorbency of at least about 100% can be used for this purpose. Diatomaceous earth commercially available under the name "Filter-Cel" (trademark) having a density of about 7 pounds per cubic foot and a water absorbency of about 220% is a preferred filler material for this purpose. Alternatively, expanded perlite may be similarly used.

In addition to the essential components listed above, the dough (i.e., plastic mass) used to form the packing sheets will contain suitable volatile solvent, e.g., about 40% to about 60%, preferably about 45% to about 55%, by weight of the total mixture (dough) prior to sheeting. Gasoline is a typical suitable solvent, but other organic solvents such as hexane, naphtha, benzene, xylene ketones such as methylethyl ketone and acetone, and the like, may be used. For a preferred mixture of butadiene-styrene (SBR) rubber and butadiene-acrylonitrile (NBR) rubber, the preferred solvent is a methyl-substituted benzene such as toluene or xylene.

No special fabrication equipment is required in carrying out the methods of the invention. The compressed sheet-forming machines are standard equipment used to produce compressed asbestos sheets as encompassed by ASTM designation D–1170. Accordingly, the improvements afforded by the invention may be readily adopted by established manufacturing facilities and handled by the personnel acquainted with the sheeter process of making asbestos fiber packing and gasket materials.

The new compressed asbestos sheet packing materials are very low in porosity, for exceeding beater sheet products in this regard. As is well known by the industry, beater sheet procedures often produce incompletely formed products having small pores or voids due to evaporation of water from the slurry in the sheet-forming operations. This invention makes it possible to produce a packing sheet which has most of the desirable characteristics of the beater sheet while avoiding the high porosity and low tensile characteristics of the beater sheet. With the new methods, it is possible to produce packings or gaskets of most any desired thickness from paper thin, e.g., about 5 mils to one-quarter inch or possibly even thicker if this is required for a particular desired end use.

I claim:

1. A process of producing a compressed, built-up laminar sheet packing product with a density of between about 1.2 to about 2.5 pounds per square yard for sheet thickness of about $\frac{1}{32}$ inch comprising (1) admixing components comprising, in approximate percentages by weight of the product (a) about 3 to 25% of a low-bulk-density of between about 5 to about 7 pounds per cubic foot hydrated calcium silicate, (b) about 10 to 50% of at least one low bulk density filler selected from the group consisting of diatomaceous earth, expanded perlite and magnesium silicate, (c) about 40 to 75% of asbestos fibers, and (d) about 13 to 35% of at least one elastomeric binder selected from the group consisting of natural rubber and synthetic rubber, and (2) calendering said admixed components into a sheet, provided said hydrated calcium silicate is present in weight ratio to said low bulk density filter, ranging from about 1:4 to about 2:1.

2. A process according to claim 1, in which said low bulk density filler is substantially diatomaceous earth filler, in which said admixing includes solvating said elastomer binder, and thereafter admixing therewith remaining components upon a calender roll-sheeter, and removing said sheet from said calender roll.

3. A process according to claim 2, in which said calcium silicate ranges from about 5% up to about 25% by weight of said composition prior to said sheeting, and in which said calender roll during said forming step is at a temperature of at least 210° F. up to about 280° F.

4. A process according to claim 3, in which said asbestos fibers range from about 45% up to about 55%, and elastomeric binder ranges from about 13% up to about 35%.

5. A process according to claim 4, in which said diatomaceous earth filler ranges from about 15% to about 25%, said hydrated calcium silicate ranges from about 5% to about 15% and is of a low bulk density of between about 5 to about 6 pounds per cubic foot, said asbestos fibers range from about 45% to about 55%, said elastomeric rubber binder ranges from about 20% to about 25%, and said elastomeric rubber binder being selected from the group consisting of butadiene-styrene, butadiene acrylonitrile, and mixtures of butadiene-styrene and butadiene acrylonitrile, and the built-up laminar sheet packing product has a density of between about 1.7 to about 1.8 pounds per square yard for sheet thickness of about $\frac{1}{32}$ inch.

6. A process according to claim 5, in which said elastomeric rubber binder additionally includes about 2 to 15% of compounding ingredients comprising zinc oxide, sulfur, and a vulcanization accelerator.

7. A process according to claim 6, in which said about 2 to 15% of elastomeric rubber compounding ingredients additionally include carbon black.

8. A low density compressed, built-up laminar sheet packing with a density of between about 1.2 to about 2.5 pounds per square yard for sheet thickness of about $\frac{1}{32}$ inch mesh, of a composition comprising, in approximate percentages by weight of the composition, about 3 to 25% of a low-bulk-density of between about 5 to about 7 pounds per cubic foot hydrated calcium silicate, about 10 to 50% of at least one low bulk density filler selected from the group consisting of diatomaceous earth, expanded perlite and magnesium silicate, about 40 to 75% of asbestos fibers, and about 13 to 35% of at least one elastomeric binder selected from the group consisting of natural rubber and synthetic rubber, provided said hydrated calcium silicate is present in a weight ratio to said low bulk density filler, ranging from about 1:4 to about 2:1.

9. A composition according to claim 8, in which said low bulk density filler is substantially diatomaceous earth filler, and in which said ratio ranges from about 3:8 to about 1:1.

10. A composition according to claim 9, in which said hydrated calcium silica ranges from about 5% up to about 25% by weight of said composition and is of a low bulk density of between about 5 to about 7 pounds per cubic foot and in which said filler comprises diatomaceous earth present in an amount ranging from about 10% up to about 50%.

11. A composition according to claim 10, in which said asbestos fibers range from about 45% up to about 55%, said elastomeric rubber binder ranges from about 13% to about 35%.

12. A composition according to claim 11, wherein the built-up laminar sheet packing product has a density of between about 1.7 to about 1.8 pounds per square yard for sheet thickness of about $\frac{1}{32}$ inch, in which said diatomaceous earth filler ranges from about 15% to about 25%, said hydrated calcium silicate ranges from about 5% to about 15% and is of low bulk density of between about 5 to about 6 pounds per cubic foot, said asbestos fibers range from about 45% to about 55%, said elastomeric rubber binder ranges from about 20% to about 25%, and said elastomeric rubber binder being selected from the group consisting of butadiene-styrene, butadiene acrylonitrile, and mixtures of butadiene-styrene and butadiene acrylontrile.

13. A composition according to claim 12, in which said elastomeric rubber binder additionally includes about 2 to 15% of compounding ingredients comprising zinc oxide, sulfur, and a vulcanization accelerator.

14. A composition according to claim 13, in which said about 2 to 15% of elastomeric rubber compounding ingredients additionally include carbon black.

References Cited

UNITED STATES PATENTS

| | | | |
|---|---|---|---|
| 2,534,814 | 12/1950 | D'Olier | 260—41.5 A |
| 2,698,788 | 1/1955 | Greenman et al. | 260—41.5 A |
| 3,433,757 | 3/1969 | Sturrock | 260—41.5 A |

MORRIS SUSSMAN, Primary Examiner

U.S. Cl. X.R.

161—170; 260—41.5 A; 264—175